United States Patent
Huynh et al.

(10) Patent No.: US 6,568,174 B2
(45) Date of Patent: May 27, 2003

(54) PROCESS AND APPARATUS FOR REDUCING WARM-UP EMISSIONS OF A DIRECT INJECTION INTERNAL COMBUSTION ENGINE

(75) Inventors: Ngoc-Hoa Huynh, Leonberg (DE); Lorenz Salzer, Rutesheim (DE); Peter Gerl, Esslingen (DE); Alf Degen, Meinersen (DE)

(73) Assignees: Dr. Ing H.C.F. Porsche Aktiengesellschaft, Stuttgart (DE); Audi AG, Ingolstadt (DE); Volkswagen AG, Wolfsburg (DE); DaimlerChrysler AG, Stuttgart (DE); Bayerische Motoren Werke AG, Munich (DE)

( * ) Notice: Subject to any disclaimer, the term of this patent is extended or adjusted under 35 U.S.C. 154(b) by 0 days.

(21) Appl. No.: 09/924,462

(22) Filed: Aug. 9, 2001

(65) Prior Publication Data

US 2002/0035831 A1 Mar. 28, 2002

(30) Foreign Application Priority Data

Aug. 9, 2000 (DE) .......................... 100 38 744

(51) Int. Cl.$^7$ ................................ F01N 3/00
(52) U.S. Cl. .............. 60/284; 60/274; 60/285; 60/301; 60/303; 60/286
(58) Field of Search ........... 60/284, 285, 286, 60/301, 300, 303

(56) References Cited

U.S. PATENT DOCUMENTS

| | | | | |
|---|---|---|---|---|
| 3,577,728 A | * | 5/1971 | Brimer et al. ............. 60/264 |
| 3,751,914 A | | 8/1973 | Pollock | |
| 3,854,288 A | * | 12/1974 | Heitland et al. ........... 60/300 |
| 3,886,739 A | * | 6/1975 | Lee .......................... 60/286 |
| 4,163,772 A | * | 8/1979 | Brown ...................... 60/286 |
| 4,218,880 A | * | 8/1980 | Kuroda et al. ............. 60/278 |
| 4,858,431 A | * | 8/1989 | Leonhard et al. ........... 60/311 |
| 5,207,058 A | * | 5/1993 | Sasaki et al. .............. 60/284 |
| 5,285,640 A | * | 2/1994 | Olivo ....................... 60/301 |
| 5,419,123 A | * | 5/1995 | Masters .................... 60/274 |
| 5,425,233 A | | 6/1995 | Ma et al. | |
| 5,465,574 A | * | 11/1995 | Ma .......................... 60/300 |
| 5,479,775 A | | 1/1996 | Kraemer et al. | |
| 5,634,330 A | * | 6/1997 | Achleitner et al. ......... 60/274 |
| 5,685,144 A | * | 11/1997 | Ma .......................... 60/284 |
| 5,826,425 A | | 10/1998 | Sebastiano et al. | |
| 5,867,982 A | * | 2/1999 | Tengblad et al. ........... 60/274 |
| 5,956,942 A | | 9/1999 | Sebastiano et al. | |
| 5,972,299 A | * | 10/1999 | Huang et al. .............. 60/303 |
| 5,975,046 A | * | 11/1999 | Kaneko et al. ............. 60/278 |
| 6,041,591 A | * | 3/2000 | Kaneko et al. ............. 60/278 |
| 6,089,015 A | * | 7/2000 | Strehlau et al. ........... 60/274 |
| 6,327,847 B1 | * | 12/2001 | Surnilla et al. ........... 60/274 |

FOREIGN PATENT DOCUMENTS

| | | |
|---|---|---|
| DE | 19534903 | 4/1996 |
| EP | 0422432 | 4/1991 |
| GB | 2278299 | * 11/1994 |
| JP | 59-202310 | * 11/1984 |
| WO | 93/07365 | 4/1993 |

* cited by examiner

Primary Examiner—Thomas Denion
Assistant Examiner—Diem Tran
(74) Attorney, Agent, or Firm—Crowell & Moring LLP

(57) ABSTRACT

A method and an arrangement are provided for reducing warm-up emissions in the exhaust system of a direct-injection internal-combustion engine. The method includes the steps of adjusting a lean air/fuel mixture for the engine-related combustion; implementing a late injection into the exhaust gas during the exhaust cycle of the internal-combustion engine, so that the exhaust gas contains an essentially stoichiometric air/fuel mixture; and igniting the stoichiometric air/fuel mixture contained in the exhaust gas in the proximity of a catalyst device for heating up the catalyst device.

10 Claims, 1 Drawing Sheet

PROCESS AND APPARATUS FOR REDUCING WARM-UP EMISSIONS OF A DIRECT INJECTION INTERNAL COMBUSTION ENGINE

BACKGROUND AND SUMMARY OF THE INVENTION

This application claims the priority of German Patent Document 100 38 744.6, filed in Germany, Aug. 9, 2000, the disclosure of which is expressly incorporated by reference herein.

The present invention relates to a method and to an arrangement for reducing warm-up emissions of a direct-injection internal-combustion engine.

The pollutant emission of Otto cycle engines can be effectively reduced by a catalytic aftertreatment. This essentially involves the complete burning of the not yet completely burnt fuel. A catalyst promotes the afterburning of reactive CO (carbon monoxide) and HC (hydrocarbons) to harmless carbon dioxide ($CO_2$) and water ($H_2O$) and simultaneously reduces nitrogen oxides ($NO_x$) occurring in the exhaust gas to neutral nitrogen ($N_2$).

A three-way catalyst, for example, is customary which decomposes all three pollutants CO, HC and $NO_x$ simultaneously. It has a tube structure made of ceramics which are coated with precious metals, preferably platinum and rhodium, the latter metals accelerating the chemical decomposition of the pollutants.

The catalytic three-way method requires the mixture to have a stoichiometric composition. A stoichiometric mixture composition is characterized by an air ratio of $\lambda=1.00$. At this mixture composition, the catalyst operates with a very high efficiency. A deviation of only one percent already considerably impairs the efficiency of the pollutant conversion.

For a use in the mixture control, the known $\lambda$-probe supplies a signal concerning the momentary mixture composition to the control unit. The $\lambda$-probe is installed in the exhaust pipe of the engine at a point at which the exhaust gas homogeneity required for the operation of the system exists over the entire operating range of the engine.

In order to completely utilize the consumption potential, particularly of a direct-injection Otto engine, it is necessary to operate the engine with an excess of air, thus, in a lean fashion ($\lambda>1$). However, in this lean operating mode, the known three-way catalysts are ineffective because they can no longer convert the nitrogen oxides ($NO_x$).

As another possibility for removing $NO_x$ from the lean exhaust gas, the $NO_x$ storage catalyst known per se represents a promising alternative. In the new condition of such an $NO_x$ storage catalyst, exhaust gas limit values can be maintained which are known and valid today. However, $NO_x$ storage catalysts require a regular detoxification (desulfatization) in order to maintain their efficiency.

Known precatalysts or starting catalysts (VK), as they are required for meeting strict exhaust gas limit values in the warm-up phase, represent a serious impairment of the operation of such an $NO_x$ storage catalyst. As a result of their system-caused oxygen storage capacity, they impair the regeneration phases of the $NO_x$ storage catalyst and cause high additional costs for the also required desulfatization processes while the construction expenditures are high.

As an alternative, electrically heatable catalysts are known which permit the elimination of precatalysts. As a result of the high required electric power and the type of construction, these electrically heated catalysts also cause high indirect and direct costs.

It is an object of the present invention to provide a method and an arrangement for reducing warm-up emissions of a direct-injection internal-combustion engine, whereby the starting temperature of a catalyst device can be reached in a rapid and effective manner.

This object is achieved according to preferred embodiments of the invention by providing a method for reducing warm-up emissions in the exhaust system of a direct-injection internal-combustion engine, characterized by adjusting a lean air/fuel mixture for the engine-related combustion, carrying out a late injection into the exhaust gas during the exhaust cycle of the internal-combustion engine, so that the exhaust gas contains an essentially stoichiometric air/fuel mixture, and igniting the stoichiometric air/fuel mixture contained in the exhaust gas in the proximity of a catalyst device for heating the catalyst device.

This object is also achieved according to preferred embodiments of the invention by providing an arrangement for reducing warm-up emissions in the exhaust system of a direct-injection internal combustion engine, characterized by an adjusting device for adjusting a lean air/fuel mixture for the engine-related combustion, an injection device for implementing a late injection into the exhaust gas during the exhaust cycle of the internal-combustion engine, so that the exhaust gas contains an essentially stoichiometric air/fuel mixture, and an ignition device for igniting the stoichiometric air/fuel mixture contained in the exhaust gas in the proximity of the catalyst device for heating the catalyst device.

The method according to the invention for reducing warm-up emissions having the above-mentioned features and the corresponding arrangement have the advantage that, while the efficiency is the same as that of known systems, the precatalyst as well as the secondary air pump can be eliminated. Furthermore, the heating device absorbs only a fraction of the electric energy of the electrically heated catalysts.

The present invention utilizes the possibility limited to direction-injection engines of adding fuel again to the burnt exhaust gas during the exhaust phase or discharge phase, thus when the outlet valve is open, which is also called a late injection. Another advantage of such a direction injection is the fact that the composition of the air-fuel mixture, thus the $\lambda$-value, can be freely selected for generating the engine power within system-dependent limits. It is differentiated in this case between the $\lambda$-value in the engine ($\lambda_M$), which is the mixture composition during the combustion taking place for generating the engine power, and the $\lambda$-value of the catalyst ($\lambda_K$), which is the mixture composition effective in the catalyst.

The invention suggests that, immediately after the cold start, the $\lambda_M$ be selected to be so lean that, after the engine-related combustion, a significant $O_2$ concentration remains in the exhaust gas; that is, $\lambda_M$ is much greater than 1. As a result of the late injection after the opening of the outlet valve, an amount of fuel is added to the exhaust gas which corresponds to the $O_2$ concentration, so that an essentially stoichiometric exhaust gas composition ($\lambda_K=1$) is present in the catalyst, so that, at this point in time, the exhaust gas, in addition to the oxygen, also carries along a corresponding amount of fuel.

The heating device is preheated to such high temperatures that it is suitable for igniting the stoichiometric air/fuel mixture fed in the exhaust gas again in the direct proximity of the catalyst device.

Advantageous features and further developments and improvements of the invention are described herein and in the claims.

According to a further development of preferred embodiments of the invention, the catalyst device has a first catalyst close to the engine and a second catalyst away from the engine which are arranged behind one another. The ignition takes place between the two catalysts. As a result of the placing of the ignition arrangement behind the first monolith, the heating device is protected from excess fluctuations of pressure and temperature, and the use of the second monolith as the starting catalyst takes into account its thermal stress which is low anyhow. The heating element is used for igniting the combustible air/fuel mixture, which is supplied by the engine, in the direct proximity of the second monolith, so that it is used for the heating of the second monolith and heats the latter, in the case of a corresponding coordination, within a short time, to a light-off temperature of approximately 250° C.

According to another feature of preferred embodiments of the invention, the first catalyst is an $NO_x$ storage catalyst.

According to another feature of preferred embodiments of the invention, the second catalyst is an $NO_x$ storage catalyst or a 3-way catalyst.

According to another feature of preferred embodiments of the invention, the ignition is carried out by an ignition arrangement arranged in the exhaust gas flow, which ignition arrangement expediently has a frame, which is wound with a catalytically coated heating wire and can be installed into an exhaust gas train of the exhaust system transversely to the flow axis of the exhaust gas, and a power supply device for supplying the heating wire with electric current for generating a predetermined heating wire temperature. It may include, for example, a resistance wire which is arranged in a grid shape and is coated with platinum as the catalyst material. As a result of the lower heat capacity resulting from the low mass, the electric power required for the heating, even at a high temperature of the heating element, is considerably lower than would be required for heating an entire monolith.

Other objects, advantages and novel features of the present invention will become apparent from the following detailed description of the invention when considered in conjunction with the accompanying drawings.

DETAILED DESCRIPTION OF THE DRAWINGS

Figure 1:
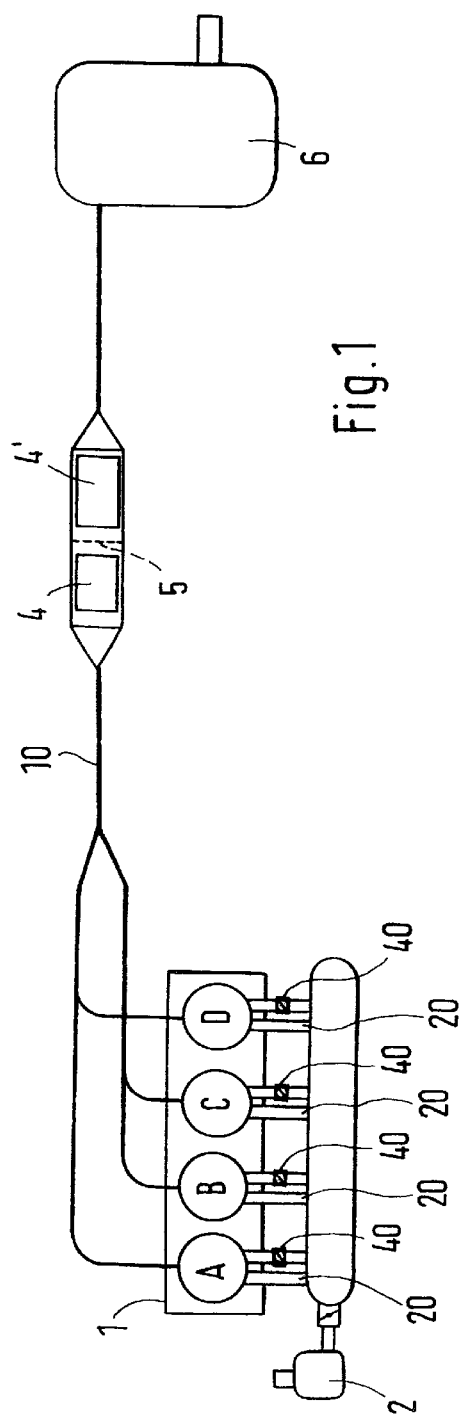
FIG. 1 is a schematic representation of an exhaust system of an internal-combustion engine with a direct injection as an embodiment of the present invention.

FIG. 1 is a schematic representation of an exhaust system of an internal-combustion engine with a direct injection as an embodiment of the present invention.

In FIG. 1, reference number 1 indicates an internal-combustion engine with four cylinders A to D; 2 indicates an air filter; 20 indicates intake pipes; and 40 indicates swirl flaps for generating the turbulence for the respective cylinders A to D; 10 indicates an exhaust pipe; 4 indicates an $NO_x$ storage catalyst; 4' indicates a three-way catalyst connected on the output side; and 6 indicates a rear muffler.

In the warm-up phase, an additional late injection of fuel into the exhaust gas takes place during the exhaust cycle by the appropriate control of the direct injection.

More precisely, an adjusting of a lean air/fuel mixture takes place to, for example, $\lambda_M=1.8$ for the engine-related combustion. A late injection is carried out during the exhaust cycle of the internal-combustion engine into the exhaust gas, so that the exhaust gas contains an essentially stoichiometric air/fuel mixture $\lambda_M=1.00$. Then an ignition of the stoichiometric air/fuel mixture contained in the exhaust gas takes place between the two catalysts 4, 4' by means of a suitable heating device 5.

Figure 2:
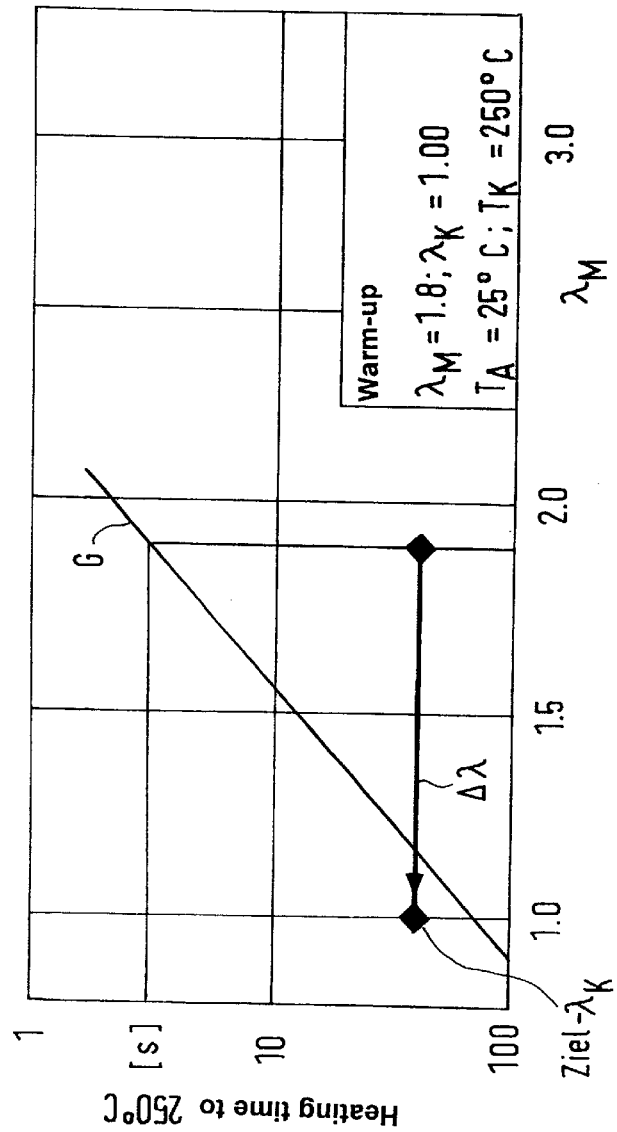
FIG. 2 is a representation of the temperature rise in the case of a variation of the λ-value in the first embodiment for illustrating the method of the invention.

FIG. 2 is a representation of the temperature rise in the case of a variation of the λ-value in the embodiment for illustrating the method according to the invention.

The $\lambda_M$-value is entered on the x-axis and the pertaining heating time to 250° C. is entered on the Y-axis. As an example, the straight line G shows an operating point with a rotational speed of 2,000 r.p.m. and a specific work $w_e$ 0.2 $kJ/dm^3$.

In the warm-up operation, $\lambda_M=1.8$, whereby an exhaust gas temperature $T_A$ of 25° C. is reached in the exhaust gas elbow. The $\lambda_K$ target for the warm-up phase is at 1.00, and the catalyst temperature target $T_K$ is at 250° C.

These target values are reached by $\lambda_M=1.8$ as well as by a $\lambda_K$ change $\Delta\lambda$ caused by a late injection, whereby a catalyst temperature rise is caused to 250° C.

The ignition arrangement expediently comprises a frame, which is wound with a catalytically coated heating wire and which can be installed into an exhaust gas train of the exhaust system transversely to the flow axis of the exhaust gas, as well as a power supply device for supplying the heating wire with an electric current for generating a predetermined heating wire temperature.

Although the present invention was described above by means of preferred embodiments, it is not limited thereto but can be modified in multiple fashions.

Naturally, the invention is not limited to a four-cylinder internal-combustion engine but can be applied to any number of cylinders.

The catalyst connected on the output side may also be an $NO_x$ storage catalyst.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Method for reducing warm-up emissions in the exhaust system of a direct-injection internal-combustion engine, comprising:

adjusting a lean air/fuel mixture for the engine-related combustion, carrying out a late injection into the exhaust gas during the exhaust cycle of the internal-combustion engine, so that the exhaust gas contains an essentially stoichiometric air/fuel mixture, and igniting the stoichiometric air/fuel mixture contained in the exhaust gas in the proximity of a catalyst device for heating the catalyst device, wherein the catalyst device has a first catalyst close to the engine and a second catalyst away from the engine, which are arranged behind one another, and wherein the ignition takes place between the two catalysts;

and further wherein the first catalyst is an $NO_x$ storage catalyst and the second catalyst is one of an $NO_x$ storage catalyst and a 3-way catalyst.

2. Method according to claim 1,
wherein the ignition is carried out by an ignition arrangement arranged in the exhaust gas flow.

3. Arrangement for reducing warm-up emissions in the exhaust system of a direct-injection internal combustion engine, comprising:
   an adjusting device for adjusting a lean air/fuel mixture for the engine-related combustion,
   an injection device for implementing a late injection into the exhaust gas during the exhaust cycle of the internal-combustion engine, so that the exhaust gas contains an essentially stoichiometric air/fuel mixture, and
   an ignition device for igniting the stoichiometric air/fuel mixture contained in the exhaust gas in the proximity of a catalyst device for heating the catalyst device,
   wherein the catalyst device has a first catalyst close to the engine and a second catalyst away from the engine, which are arranged behind one another, and wherein the ignition takes place between the two catalysts;
   and further wherein the first catalyst is an $NO_x$ storage catalyst and the second catalyst is one of an $NO_x$ storage catalyst and a 3-way catalyst.

4. Arrangement according to claim 3,
wherein the ignition device comprises:
   a frame which is wound with a heating wire and can be installed into an exhaust gas train of the exhaust system transversely to a flow axis of the exhaust gas, and
   a power supply device for supplying the heating wire with electric current for generating a predetermined heating wire temperature,
   the frame defining a flow range in which a heating wire grid is provided.

5. Arrangement according to claim 4,
wherein the heating wire is catalytically coated.

6. A method of operating a direct-injection engine to reduce warm-up emission in the exhaust system of the engine, comprising:
   adjusting a lean air/fuel mixture for the engine-related combustion,
   carrying out a late injection into the exhaust gas during the exhaust cycle of the internal-combustion engine, so that the exhaust gas contains an essentially stoichiometric air/fuel mixture, and
   igniting the stoichiometric air/fuel mixture contained in the exhaust gas in the proximity of a catalyst device for heating the catalyst device,
   wherein the catalyst device has a first catalyst close to the engine and a second catalyst away from the engine, which are arranged behind one another, and wherein the ignition takes place between the two catalysts;
   and further wherein the first catalyst is an $NO_x$ storage catalyst and the second catalyst is one of an $NO_x$ storage catalyst and a 3-way catalyst.

7. Method according to claim 6,
wherein the ignition is carried out by an ignition arrangement arranged in the exhaust gas flow.

8. A direct-injection internal combustion engine comprising:
   an exhaust system,
   an adjusting device for adjusting a lean air/fuel mixture for the engine-related combustion,
   an injection device for implementing a late injection into the exhaust gas during the exhaust cycle of the internal-combustion engine, so that the exhaust gas contains an essentially stoichiometric air/fuel mixture, and
   an ignition device for igniting the stoichiometric air/fuel mixture contained in the exhaust gas in the proximity of the catalyst device for heating the catalyst device,
   wherein the catalyst device has a first catalyst close to the engine and a second catalyst away from the engine, which are arranged behind one another, and wherein the ignition takes place between the two catalysts;
   and further wherein the first catalyst is an $NO_x$ storage catalyst and the second catalyst is one of an $NO_x$ storage catalyst and a 3-way catalyst.

9. An engine according to claim 8,
wherein the ignition device comprises:
   a frame which is wound with a heating wire and can be installed into an exhaust gas train of the exhaust system transversely to a flow axis of the exhaust gas, and
   a power supply device for supplying the heating wire with electric current for generating a predetermined heating wire temperature,
   the frame defining a flow range in which a heating wire grid is provided.

10. An engine according to claim 9,
wherein the heating wire is catalytically coated.

\* \* \* \* \*